US011951517B2

(12) United States Patent
Wijnveldt

(10) Patent No.: US 11,951,517 B2
(45) Date of Patent: Apr. 9, 2024

(54) APPARATUS FOR CLEANING THE INNER SIDE OF A TANK

(71) Applicant: Johnny Martin Wijnveldt, Assen (NL)

(72) Inventor: Johnny Martin Wijnveldt, Assen (NL)

( * ) Notice: Subject to any disclaimer, the term of this patent is extended or adjusted under 35 U.S.C. 154(b) by 959 days.

(21) Appl. No.: 16/958,115

(22) PCT Filed: Dec. 19, 2018

(86) PCT No.: PCT/EP2018/085869
§ 371 (c)(1),
(2) Date: Jun. 25, 2020

(87) PCT Pub. No.: WO2019/134831
PCT Pub. Date: Jul. 11, 2019

(65) Prior Publication Data

US 2020/0346260 A1 Nov. 5, 2020

(30) Foreign Application Priority Data

Jan. 2, 2018 (EP) .................................... 18150075
Apr. 5, 2018 (EP) .................................... 18165849

(51) Int. Cl.
*B08B 9/08* (2006.01)
*B05B 3/04* (2006.01)
*B08B 13/00* (2006.01)

(52) U.S. Cl.
CPC .......... *B08B 9/0813* (2013.01); *B05B 3/0445* (2013.01); *B08B 13/00* (2013.01); *B08B 2209/08* (2013.01)

(58) Field of Classification Search
None
See application file for complete search history.

(56) References Cited

U.S. PATENT DOCUMENTS

2009/0173362 A1* 7/2009 Bramsen ............... B08B 9/0936 134/57 R
2017/0173617 A1 6/2017 Zilai et al.
2018/0281032 A1* 10/2018 Kitamura .............. B08B 9/0936

FOREIGN PATENT DOCUMENTS

DE 102012011788 A1 12/2013
WO WO9105620 A1 5/1991

(Continued)

OTHER PUBLICATIONS

International Search Report and Written Opinion for corresponding International application No. PCT/EP2018/085869; dated Apr. 1, 2019 (11 pages).

(Continued)

*Primary Examiner* — Cristi J Tate-Sims
(74) *Attorney, Agent, or Firm* — Mendelsohn Dunleavy, P.C.

(57) ABSTRACT

Apparatus for cleaning a tank's inner side includes a tank-mountable frame, a frame-mounted support drivable with respect to the frame about a first rotation axis, a support-mounted nozzle drivable with respect to the support about a second rotation axis transverse to the first axis. The nozzle's spraying direction faces away from the second axis. A controller of the apparatus drives the support and the nozzle, such that the nozzle is rotated about the second axis alternatingly from a start position to a stop position by a predefined cleaning angle smaller than one revolution and from the stop position to the start position. The nozzle angular velocity with respect to the support is smaller than the support angular velocity with respect to the frame within the cleaning angle and smaller than the nozzle angular velocity with respect to the support during movement from the stop position to the leaning start position.

21 Claims, 7 Drawing Sheets

(56) References Cited

FOREIGN PATENT DOCUMENTS

| | | | | |
|---|---|---|---|---|
| WO | WO-2015063320 A1 * | 5/2015 | ........... | B05B 3/0445 |
| WO | WO2015063320 A1 | 5/2015 | | |

OTHER PUBLICATIONS

International Preliminary Report on Patentability for corresponding International application No. PCT/EP2018/085869; dated Jul. 7, 2020 (8 pages).

* cited by examiner

APPARATUS FOR CLEANING THE INNER SIDE OF A TANK

BACKGROUND

Field of the Disclosure

The present invention relates to an apparatus for cleaning the inner side of a tank.

Description of the Related Art

An apparatus as described above is known from WO 91/05620. The known apparatus has nozzles which are attached to a vertical bevel gear which rolls over a stationary horizontal bevel gear. Consequently, the vertical bevel gear is rotated about the vertical first axis of rotation. Simultaneously, the nozzles make a periodic rotating movement about the second axis of rotation in a plane. Hence, during the rolling movement the nozzles simultaneously rotate about the vertical first axis and about the horizontal second axis. The vertical bevel gear is driven about the horizontal second axis of rotation by reaction forces of the fluid flows which leave the respective nozzles. Due to the transmission of the bevel gears the reaction forces also drive the vertical gear about the vertical first axis.

Under operating conditions the nozzles of the known apparatus create fluid impingement tracks on the inner wall of a tank. Due to the dictated movements of the nozzles a part of successive diagonal portions of the impingement tracks develop in upward direction of the tank whereas another part of successive diagonal portions of the impingement tracks develop in downward direction. In the latter case the preceding impingement track portion does not only remove undesired substance from the inner wall but also causes the cleaning fluid to flow downwardly along the wall, which improves the effect of the next impingement track portion. In the former case, however, a successive impingement track portion is sprayed on a fully contaminated part of the wall whereas the cleaning fluid, possibly together with the removed substance, flows downwardly and may cover the part of the wall which had already been cleaned by the preceding impingement track portion.

SUMMARY

An object of the invention is to provide an improved apparatus for cleaning the inner side of a tank.

This object is accomplished with the apparatus according to the invention, which is characterized in that the control system is configured such that under operating conditions the nozzle is rotated about the second axis alternatingly from a cleaning start position to a cleaning stop position by a predefined cleaning angle and from the cleaning stop position to the cleaning start position, which cleaning angle is smaller than one revolution, and the angular velocity of the nozzle with respect to the nozzle support within the cleaning angle is smaller than the angular velocity of the nozzle support with respect to the frame and smaller than the angular velocity of the nozzle with respect to the nozzle support during the movement from the cleaning stop position to the cleaning start position.

The apparatus according to the invention provides the opportunity to apply the apparatus inside a tank and clean the tank from top to bottom. In that case the apparatus can be positioned such that the first axis extends vertically and the second axis extends horizontally, whereas a cleaning action can be performed by setting the cleaning start position of the nozzle such that its spraying direction is directed upwardly and subsequently rotating the nozzle relatively slowly about the horizontal second axis such that the spraying direction gradually shifts towards its cleaning stop position in which the spraying direction may be directed downwardly, whereas the nozzle support continuously rotates about the vertical first axis. The movement of the nozzle from the cleaning stop position to the cleaning start position is faster than within the cleaning angle.

Within the cleaning angle the nozzle rotates relatively slowly about the second axis whereas the nozzle support rotates relatively fast about the first axis. If the apparatus is located in the centre of a tank including a cylindrical wall a fluid jet from the nozzle which impinges on the wall will create a helical impingement trajectory around the first axis during the cleaning angle.

An advantage of the apparatus according to the invention is that due to the relatively fast movement of the nozzle from the cleaning stop position to the cleaning start position it is not necessary to stop spraying cleaning fluid. Preferably, cleaning fluid is continuously supplied to the nozzle during both the movement from the cleaning start position to the cleaning stop position and the movement from the cleaning stop position to the cleaning start position. It is noted that there may be some cleaning in the period that the nozzle moves from the cleaning stop position to the cleaning start position, but due to the relatively short period it is defined as a non-cleaning period for explanatory reasons. An advantage of not interrupting the cleaning fluid during the non-cleaning period is that the cleaning fluid circuit and the apparatus are prevented from pressure waves. Besides, any delay time for building up pressure and a strong jet upon starting spraying is avoided. The helical path of an impingement trajectory on a cylindrical tank wall during the non-cleaning period will have a larger pitch than during the cleaning period. During the movement of the nozzle from the cleaning start position to the cleaning stop position the angular velocity of the nozzle support with respect to the frame may be the same as within the cleaning angle.

In a preferred embodiment the angular velocities of the nozzle and the nozzle support are selected such that the position of the nozzle support with respect to the frame is different at two successive cleaning start positions of the nozzle. This provides the opportunity to shift successive impingement tracks on a tank wall such that cleaning fluid and removed substance do not cover parts of the wall which were cleaned in a previous cycle. It is noted that the application of the apparatus according to the invention is not limited to clean tanks from top to bottom.

The cleaning angle may lie between a quarter and three quarters of one revolution. In a practical embodiment the cleaning angle is a half or nearly a half revolution.

At least one of the cleaning start position and the cleaning stop position may be located where the spraying direction of the nozzle is nearly or substantially parallel to the first axis. For example, in case of applying the apparatus in a tank for cleaning the tank from top to bottom the cleaning angle may start when the spraying direction is vertically upwardly and stop when the spraying direction is vertically downwardly.

The control system may have a nozzle support drive unit which is provided at the frame and includes a main drive shaft which is drivably coupled to the nozzle support for rotating the nozzle support with respect to the frame.

The control system may be provided with a nozzle shaft to which the nozzle is mounted and which is rotatable with respect to the nozzle support about the second axis and with a nozzle drive unit that is located at the nozzle support and that is drivably coupled to the nozzle shaft.

In a preferred embodiment the nozzle support drive unit is drivably coupled to the nozzle drive unit through the main drive shaft, since this requires a minimum of parts. The coupling between the nozzle support drive unit and the nozzle drive unit can be achieved by a gear transmission, for example.

In a practical embodiment the nozzle drive unit has a nozzle drive shaft to which a first gear is attached, which first gear cooperates with a second gear that is attached to the nozzle shaft and wherein at least one of the first and second gears is provided with gear teeth along only a portion of the circumference thereof, and wherein a third gear is attached to the nozzle drive shaft, which third gear cooperates with a fourth gear that is attached to the nozzle shaft and wherein at least one of the third and fourth gears is provided with gear teeth along only a portion of the circumference thereof, wherein the first and second gears mesh with each other within the cleaning angle whereas the third and fourth gears mesh with each other outside the cleaning angle. This embodiment provides the opportunity to drive the nozzle drive shaft at a constant angular velocity, whereas the first to fourth gears are configured such that the angular velocity of the nozzle within the cleaning angle is smaller than during the movement from the cleaning start position to the cleaning stop position. It is noted that the direction of rotation of the nozzle remains the same.

The second gear may have a larger diameter than the first gear, whereas the first gear has gear teeth along its whole circumference.

The gear ratio between the second and first gear may be higher than the gear ratio between the fourth and third gear. This provides a condition in which the angular velocity within the cleaning angle is lower than outside the cleaning angle.

Alternatively, the nozzle drive unit may have a nozzle drive shaft to which a first non-circular gear is attached, which first non-circular gear cooperates with a second non-circular gear that is attached to the nozzle shaft. The non-circular gears continuously mesh with each other, but the effective transmission ratio varies during their rotation. The non-circular gears are shaped such that under operating conditions the angular velocity of the nozzle with respect to the nozzle support during a movement from the cleaning stop position to the cleaning start position is faster than during a movement from the cleaning start position to the cleaning stop position.

The main drive shaft may be drivably coupled to the nozzle drive shaft.

The nozzle shaft may be a tubular shaft for guiding cleaning fluid to the nozzle.

The nozzle support drive unit may comprise an impeller which is attached to the main drive shaft and the frame is provided with a guide for guiding cleaning fluid to the impeller so as to drive the main drive shaft. The guide may be adapted to achieve a desired rotational speed of the main drive shaft.

In an alternative embodiment, the control system is configured such that under operating conditions the nozzle rotates reciprocatingly from the cleaning start position to the cleaning stop position and back. In that case the angular velocities of the forward and backward motions are different. This also provides the opportunity to move the nozzle quickly back to its starting position of the predefined angle. In the meantime the nozzle support may still be driven such that a spray of fluid from the nozzle follows helical paths around the first axis, but it has a larger pitch in one direction than in the opposite direction.

In specific embodiments the first and second axes cross each other and/or the first and second axes are perpendicular to each other.

In a particular embodiment the control system is configured such that under operating conditions the angular velocity of the nozzle with respect to the nozzle support within the cleaning angle varies. An advantage of this feature is that the angular velocity can be adapted to the actual distance between the nozzle and the wall of the tank in which the apparatus is located. The distance between the nozzle and the wall is relatively short when the fluid jet coming from the nozzle is directed perpendicular to the wall and is larger at an increasing impingement angle with respect to a perpendicular impingement direction. This means that the amount of fluid per unit of wall surface that impinges onto the wall of the tank is lower at an increasing impingement angle with respect to a perpendicular impingement direction when rotating the nozzle at a constant angular velocity. This is compensated by varying the angular velocity of the nozzle with respect to the nozzle support within the cleaning angle.

More specifically, the angular velocity of the nozzle with respect to the nozzle support may decrease during the movement from the cleaning start position to the cleaning stop position. This may typically happen when the apparatus is located at a high level in a vertical cylindrical tank. After the nozzle has reached a horizontal position its angular velocity may be decreased to supply sufficient fluid onto the wall.

BRIEF DESCRIPTION OF THE DRAWINGS

The invention will hereafter be elucidated with reference to very schematic drawings showing embodiments of the invention by way of example.

DETAILED DESCRIPTION

Figure 1:
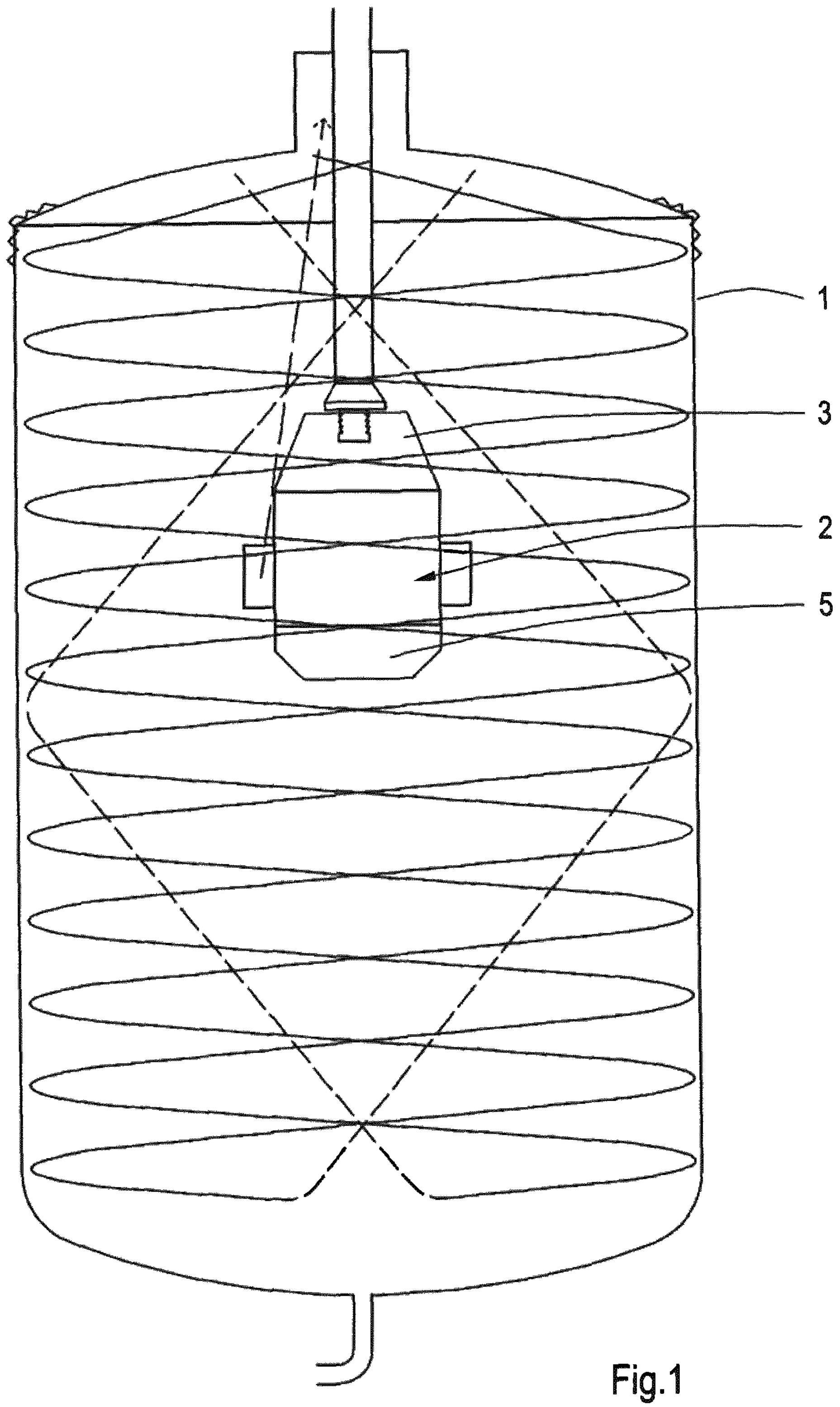
FIG. 1 is a transparent side view of a tank including an embodiment of an apparatus for cleaning the inner side of the tank according to the invention.

FIG. 1 shows a tank 1 of which the inner side can be cleaned by means of an embodiment of an apparatus 2 according to the invention, which is shown in more detail in FIGS. 2-6. The apparatus 2 has a frame 3 which is fixed to the wall of the tank 1 via a vertical tubular rod above the frame 3. Hence, the frame 3 has a fixed position with respect to the wall of the tank 1. It is noted that the apparatus 2 can be permanently located in the tank 1, but it is also possible that the apparatus 2 is a portable device which is only placed inside the tank 1 when cleaning is needed.

The apparatus 2 is also provided with two nozzles 4. The nozzles 4 are connected with a container (not shown) of cleaning fluid via the frame 3 and the tubular rod. Under operating conditions the cleaning fluid is sprayed under pressure towards the inner walls of the tank 1. The apparatus 2 has a nozzle support 5 to which the nozzles 4 are rotatably mounted. The nozzle support 5 is rotatable with respect to the frame 3 about a vertical first axis of rotation 6 and the nozzles 4 are rotatable with respect to the nozzle support 5 about respective horizontal second axes of rotation 7, which are aligned in this embodiment. The second axes of rotation 7 extend perpendicular to the first axis of rotation 6. Each of the nozzles 4 has a spraying direction which is directed away from the corresponding second axis of rotation 7.

Figure 2:
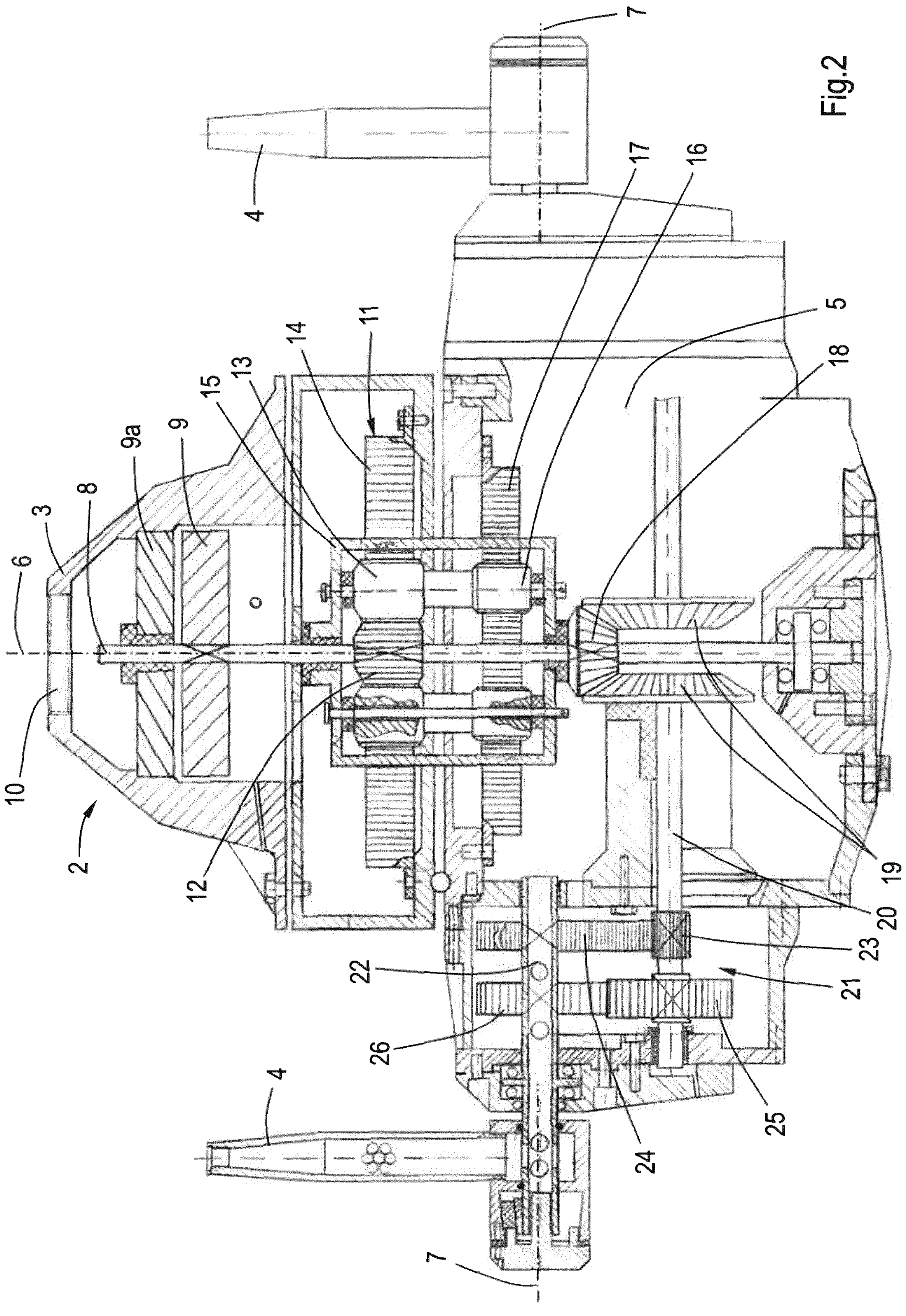
FIG. 2 is a partly sectional view of the apparatus as shown in FIG. 1 on a larger scale.
Figure 3:
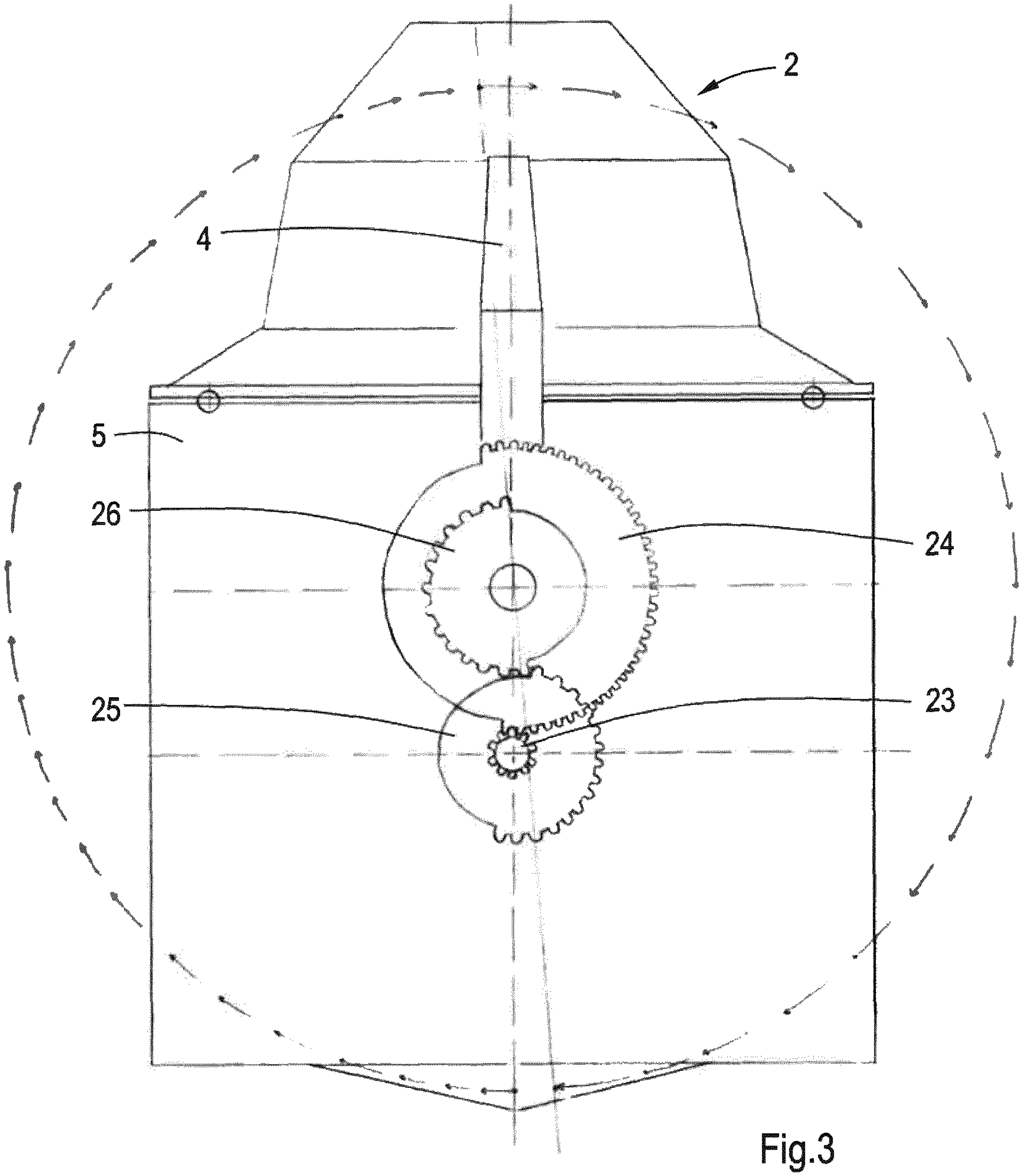
FIG. 3 is a side view of the apparatus as shown in FIG. 2 on a larger scale.

Under operating conditions the nozzles 4 and the nozzle support 5 are driven by means of a control system. In the embodiment as shown in FIGS. 2 and 3 the control system comprises a main drive shaft 8 and an impeller 9 which is fixed to the main drive shaft 8. When pressurized fluid enters the frame 3 through an opening 10 thereof the fluid passes the impeller 9 and drives the main drive shaft 8. In order to create a proper flow direction to the impeller 9 a guide element 9*a* is located upstream of the impeller 9 in this embodiment.

The control system also comprises a planetary gear train 11 which has a sun gear 12, two planet gears 13 and a ring gear 14. The ring gear 14 has a fixed position with respect to the frame 3 and the sun gear 12 is attached to the main drive shaft 8. The planet gears 13 are rotatably mounted to a planet gear housing 15 and the planet gear housing 15 is rotatably mounted to the frame 3 and the main drive shaft 8. Each of the planet gears 13 is fixed on a common planet shaft with a driving gear 16. The driving gears 16 mesh with a driving ring gear 17 which is fixed to the nozzle support 5. The diameters of the driving gears 16 are smaller than the diameters of the respective planet gears 13. Upon rotating the main drive shaft 8 the driving ring gear 17 will be driven by the driving gears 16 through the planetary gear train 11, which results in a rotational movement of the nozzle support 5 with respect to the frame 3.

The control system further comprises a horizontally oriented conical gear 18 which is fixed to the main drive shaft 8 and which meshes with two vertically oriented conical gears 19. The vertically oriented conical gears 19 are fixed to respective nozzle drive axes 20 which are rotatably mounted to the nozzle support 5. Due to this configuration the nozzle drive axes 20 rotate in opposite directions with respect to each other.

The control system also comprises gear transmissions 21 for rotating the respective nozzles 4 with respect to the nozzle support 5 at a desired angular velocity. Each of the nozzles 4 is fixed to a tubular nozzle shaft 22 which is mounted rotatably to the nozzle support 5. Each of the gear transmissions 21 is provided with a first gear 23 which is fixed to the corresponding nozzle drive axis 20 and cooperates with a second gear 24 that is fixed to the nozzle shaft 22. Each of the gear transmissions 21 is also provided with a third gear 25 which is fixed to the corresponding nozzle drive axis 20 and cooperates with a fourth gear 26 that is fixed to the nozzle shaft 22.

FIG. 3 shows that the first gear 23 has gear teeth around its whole circumference, but the second, third and fourth gear 24, 25 and 26 have gear teeth along only a part of their circumferences. If in the condition of the apparatus 2 as shown in FIG. 3 the first gear 23 is rotated anti-clockwise, the second gear 24 including the nozzle 4 will be rotated clockwise because of the engaging gear teeth of the first and second gears 23, 24, respectively. During this movement the third and fourth gears 25, 26 are disengaged. After the nozzle 4 has rotated from an upward direction to a downward direction and the end of the row of gear teeth of the second gear 24 has passed the first gear 23, the first and second gears 23, 24 will be disengaged. The length of the toothed portion along the circumference of the second gear 24 defines a cleaning angle between a cleaning start position and a cleaning stop position of the nozzle 4.

The rows of gear teeth on the third and fourth gears 25, 26 are arranged in such a way that at the moment of disengaging the first and second gears 23, 24 the third and fourth gears 25, 26 start to engage each other. Since the third gear 25 is also fixed to the nozzle drive axis 20 the third gear 25 is driven with the same angular velocity as the first gear 23. The gear ratio between the second and first gear 24, 23 is higher than the gear ratio between the fourth and third gear 26, 25. This means that the nozzle 4 is rotated in clockwise direction at a higher rotational speed when the third gear 25 drives the fourth gear 26 than when the first gear 23 drives the second gear 24 at a fixed rotational speed of the nozzle drive axis 20. Hence, when the nozzle drive shaft 20 has a constant rotational speed the nozzle 4 is rotated about the second axis 7 alternatingly from the cleaning start position to the cleaning stop position by the cleaning angle and from the cleaning stop position to the cleaning start position, whereas the angular velocity of the nozzle 4 about the second axis 7 is smaller than the angular velocity of the nozzle 4 about the second axis 7 during the movement from the cleaning stop position to the cleaning start position.

The rotational speeds of the nozzle drive axes 20 with respect to the nozzle support 5 depend on the gear ratios between the horizontally oriented conical gear 18 and the respective vertically oriented conical gears 19. In practice the vertically oriented conical gears 19 may be the same and the respective gear ratios may be 1:99, for example.

The control system may be configured such that a cleaning action starts by setting the nozzles 4 in upper positions in which their spraying directions are vertical in upward direction. The nozzle support 5 is rotated about the first axis of rotation 6 at a first angular velocity whereas the nozzles 4 are simultaneously rotated downwardly about the respective second axes of rotation 7 at a second angular velocity to lower positions in which their spraying directions are vertical in downward direction. During the downward movement the first angular velocity is larger than the second angular velocity. For example, during a half revolution of each of the nozzles 4, the nozzle support 5 may rotate a hundred times, but numerous alternative ratios are conceivable. After the nozzles 4 have reached their lower positions they are moved quickly to their upper positions. Hence, each of the nozzles 4 is rotated successively from a cleaning start position to a cleaning stop position and from the cleaning stop position to the cleaning start position.

Under operating conditions a cleaning liquid may enter the opening 10 of the frame 3 at 5-7 bar, for example. Depending on the dimensions of the components the impeller 9 may rotate at about 3000 rpm. The cleaning liquid flows through the frame 3, the nozzle support 5 and both nozzle shafts 22 to the respective nozzles 4. The rotational positions of the nozzles 4 on their corresponding nozzle shafts 22 are adjustable, in this case continuously adjustable. The dimensions of the planetary gear train 11, the driving gears 16 and the driving ring gear 17 may be selected such that under operating conditions the nozzle support 5 rotates at 3-10 rpm with respect to the frame 3. The selection may be dependent on the dimensions of the tank 1; for example, the desired resulting rotational speed may decrease with increasing tank diameter. The rotational speed of the respective nozzle drive axes 20 may be 30 rpm.

FIG. 1 shows impingement trajectories on the inner wall of the tank 1, which are created by the jets from the respective nozzles 4. In the cylindrical part of the tank 1 the trajectories have helical patterns. The pitch of each pattern can be adapted by changing the gear ratios of the gears of the apparatus 2. FIG. 1 also shows impingement trajectories by dashed lines which have relative large pitches. These impingement trajectories are generated during movement of the nozzles 4 from their cleaning stop positions to their cleaning start positions. The nozzles 4 still spray cleaning liquid onto the wall outside their cleaning angles, but this is a relatively short period. The cycle of moving the nozzles 4 from their cleaning start positions to their cleaning stop positions and returning to their cleaning start positions can be repeated several times, depending on the application of the apparatus 2.

The shape of the guide element 9*a* influences the rotational speed of the main drive shaft 8. If the apparatus 2 is applied in a system where cleaning liquid is supplied at a relatively low pressure, for example, the apparatus 2 can be provided with a different guide element 9*a* that guides the cleaning liquid more efficiently to the impeller 9 such that sufficient energy is supplied to the impeller 9 for driving the main drive shaft 8 at a desired speed.

The gear ratio between the first gear 23 and the row of gear teeth of the second gear 24 may be 1:29, which means that during a cleaning movement the rotational speed of the nozzles 4 about their second axes of rotation 7 may be about 1 rpm. This means that the nozzles 4 rotate from top to bottom in about 30 secs whereas the nozzle support 5 rotates at 3-10 rpm, for example. The gear ratio between the row of gear teeth of the third gear 25 and the row of gear teeth of the fourth gear 26 may be 1:1, which means that during an upward movement the rotational speed of the nozzles 4 about their second axes of rotation 7 is about 30 rpm, which may correspond to a movement of 1 sec.

The moment of switching from a cleaning movement to return movement can be adapted by the moment of switching from driving the nozzle shaft 22 by means of the first and second gears 23, 24 to driving the nozzle shaft 22 by means of the third and fourth gears 25, 26. It is possible to switch from cleaning movement to return movement before the nozzles 4 are directed exactly vertical to avoid that the cleaning fluid is injected directly to a drain at the bottom of the tank 1.

Figure 4:
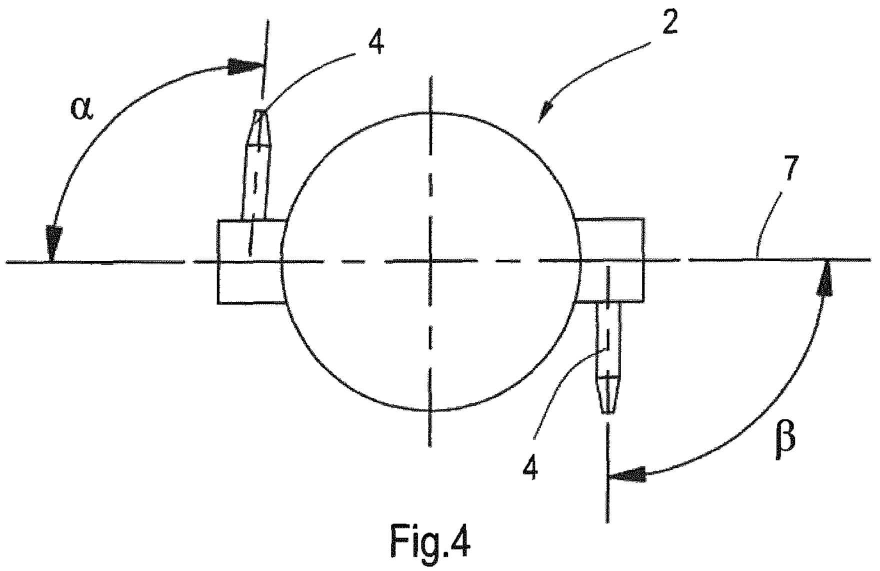
FIG. 4 is a plan view of the apparatus of FIG. 1, showing instantaneous orientations of the respective nozzles.

FIG. 4 shows the apparatus 2 from above in a condition that the nozzles 4 are in a more or less horizontal position. FIG. 4 shows that the orientations of the respective nozzles 4 with respect to the second axis of rotation 7 are different. The left nozzle 4 in FIG. 4 has a centreline which is angled with respect to the second axis 7 by an angle α, which is larger than 90°. In other words, the angle between a plane which extends perpendicularly to the second axis 7 and in which the first axis 6 lies and the centreline of the nozzle 4, is smaller than 90°. This means that the centreline of that nozzle 4 temporarily crosses the first axis 6 under operating conditions. This allows a jet from that nozzle 4 to impinge a portion of the tank 1 where the first axis 6 intersects the wall of the tank 1, as illustrated in FIG. 1. The other nozzle 4, at the right side of FIG. 4, has a centreline which extends perpendicularly to the second axis of rotation 7; hence angle β as indicated in FIG. 4 is 90°.

Figure 5:
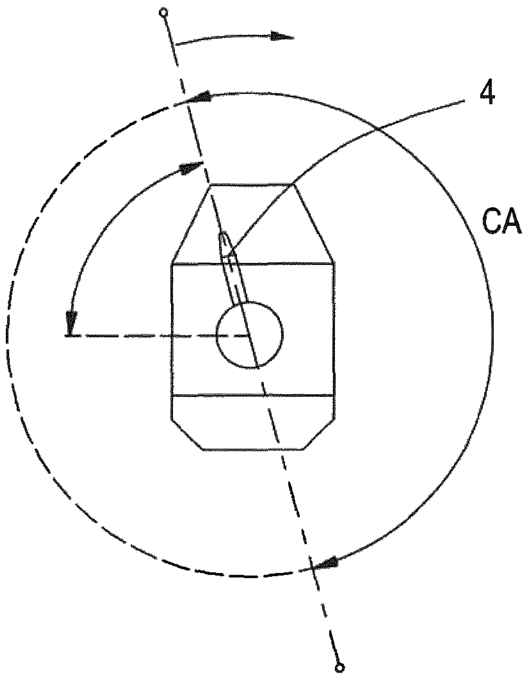
FIGS. 5 and 6 are side views from opposite directions of the apparatus of FIG. 4, but showing instantaneous orientations of the respective nozzles at a different moment under operating conditions.
Figure 6:
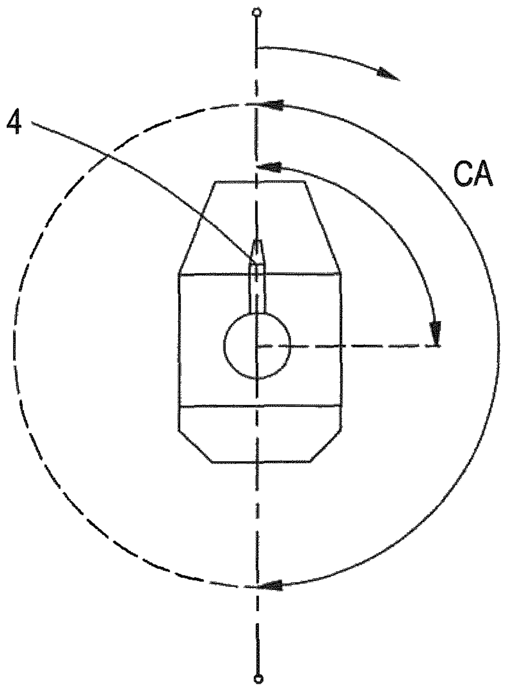

FIGS. 5 and 6 show the cleaning start positions of the respective nozzles 4. The one-headed arrows in FIGS. 5 and 6 show that the nozzles 4 rotate clockwise as seen in side view. It can be seen that the centreline of the nozzle 4 as shown in FIG. 5 is angled with respect to a vertical plane in which the second axis 7 lies, such that the nozzle 4 reaches an exact vertical upward direction after start of the cleaning movement. The cleaning angles of the respective nozzles 4 are indicated in FIGS. 5 and 6 by CA. The nozzle 4 as shown in FIG. 6, is directed vertical at the cleaning start position. In this embodiment the cleaning angles CA of both nozzles 4 are the same, i.e. 180°, but this may be different in alternative embodiments.

Figure 7:
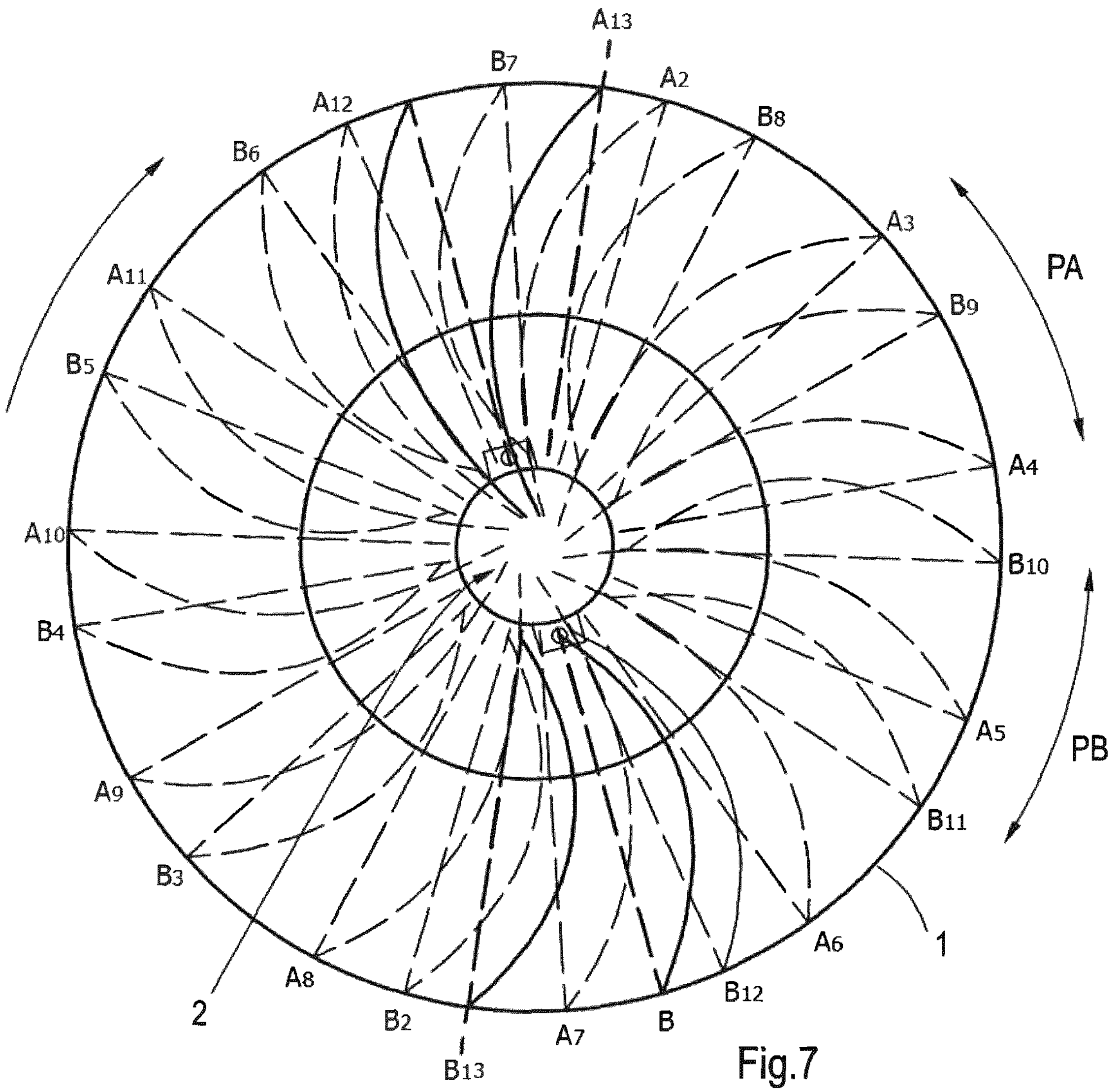
FIG. 7 is a transparent plan view of an upper wall of a tank, showing successive impingement trajectories of a cleaning fluid thereon.

FIG. 7 shows impingement trajectories of successive jets from the nozzles 4 which impinge on the upper wall of the tank 1. The trajectory which is indicated by A is the first path of impingement of the obliquely directed nozzle 4 at the left side in FIG. 4 and the trajectory which is indicated by B is the first path of impingement created by the other nozzle 4. It can be seen that due to the oblique orientation of the nozzle 4 the trajectory A starts closer to the first axis of rotation 6 than the trajectory B. The trajectory which is indicated by A2 and the trajectory which is indicated by B2 are impingement paths which are created after the nozzles 4 have returned to their cleaning start positions after the first cleaning movement. The distance between two successive trajectories of the obliquely oriented nozzle 4 can be defined by a pitch PA and the distance between two successive trajectories of the other nozzle 4 can be defined by a pitch PB, zee FIG. 7. It can be seen that in this embodiment the twelfth trajectories A12 and B12 lie close to the first trajectories A and B respectively. The thirteenth trajectories A13 and B13 do not coincide with the first trajectories A1 and B1, respectively; this is advantageous since it is desired to hit a large portion of the wall rather than hitting a portion which has already been cleaned by an earlier impingement path. Such an effect can be achieved by selecting specific gear ratios of the different gears in the apparatus 2.

Figure 8:
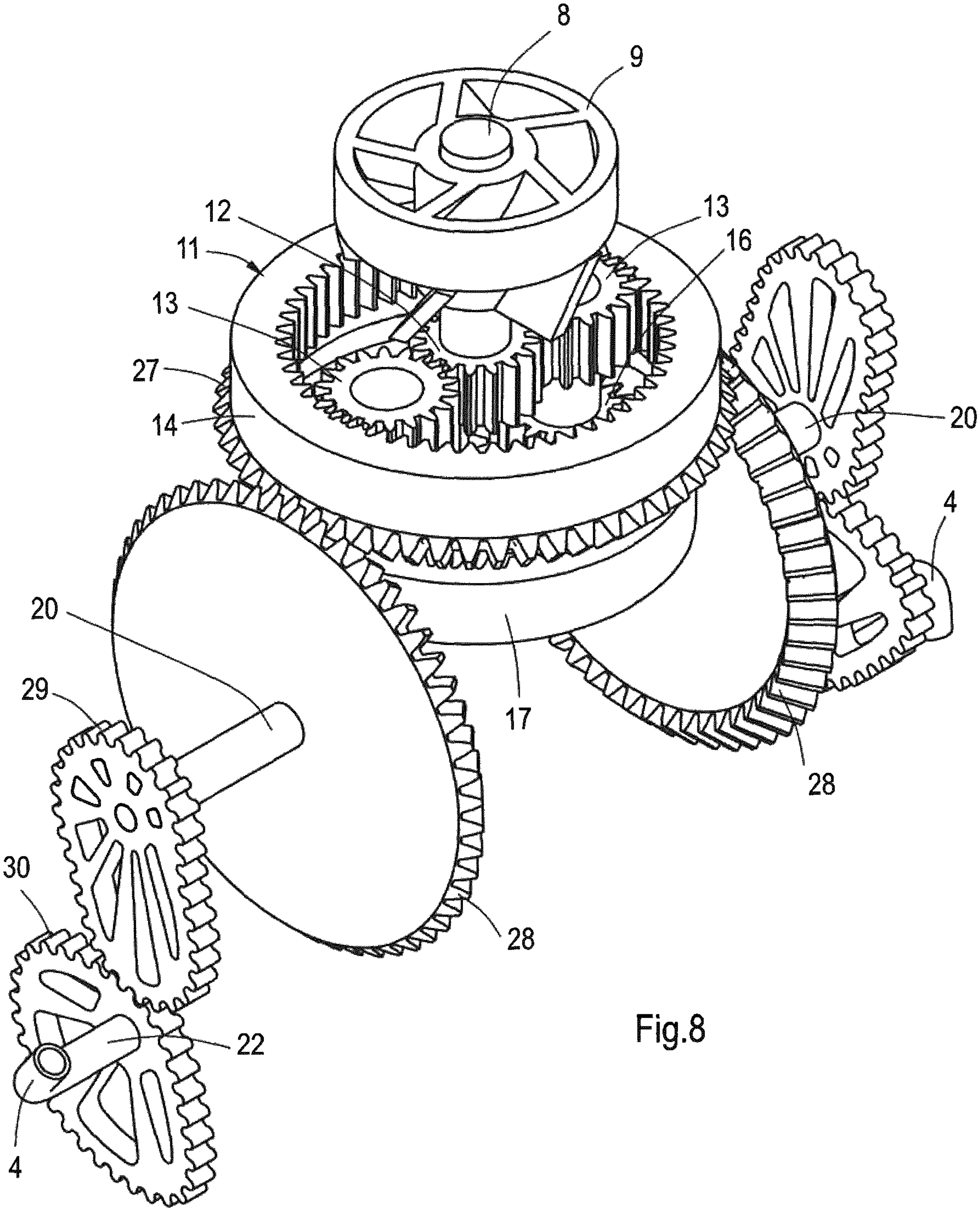
FIG. 8 is a perspective view of a part of an alternative embodiment of an apparatus for cleaning the inner side of the tank according to the invention.

FIG. 8 shows a part of an alternative embodiment of the apparatus 2. The control system of this embodiment also comprises the planetary gear train 11 including the sun gear 12, the planet gears 13 and the ring gear 14. The ring gear 14 has a fixed position with respect to the frame 3 and the sun gear 12 is attached to the main drive shaft 8. The planet gears 13 are rotatably mounted to a planet gear housing (not shown) and the planet gear housing is rotatably mounted to the frame 3. Each of the planet gears 13 is fixed on a common planet shaft with the driving gear 16. The driving gears 16 mesh with the driving ring gear 17 which is fixed to the nozzle support 5. The diameters of the driving gears 16 are smaller than the diameters of the respective planet gears 13. Upon rotating the main drive shaft 8 the driving ring gear 17 will be driven by the driving gears 16 through the planetary gear train 11, which results in a rotational movement of the nozzle support 5 with respect to the frame 3.

A lower side of the ring gear 14 is provided with a frame conical gear 27 which has a centre line extending in the same direction as the first axis of rotation 6. The frame conical gear 27 meshes with two nozzle support conical gears 28 which have a common centre line extending in the same direction as the second axis of rotation 7. The nozzle support conical gears 28 are rotatably mounted to the nozzle support 5. Since the frame conical gear 27 has a fixed position to the frame 3 the nozzle support conical gears 28 will rotate along the frame conical gear 27 when the nozzle support 5 rotates about the first axis of rotation 6. Consequently, the nozzle drive shafts 20, to which the respective nozzle support conical gears 28 are fixed, will be rotated. The frame conical gear 27 and the nozzle support conical gears 28 may be dimensioned such that they rotate at 3-10 revolutions per minute, for example. In the embodiment as shown in FIG. 8 the nozzle drive shafts 20 are drivably coupled to the respective nozzle shafts 22 through non-circular gears 29, 30. The non-circular gears create a varying transmission ratio under operating conditions such that the angular velocities of the nozzles 4 with respect to the nozzle support 5 during a movement from the cleaning stop position to the cleaning start position are faster than during a movement from the cleaning start position to the cleaning stop position.

Furthermore, the non-circular gears 29, 20 may be adapted such that the angular velocities of the nozzles 4 with respect to the nozzle support 5 vary within the cleaning angle CA. This means that the amount of fluid per unit of wall surface that impinges onto the wall of the tank 1 can be adjusted to the actual orientation of the nozzles 4 with respect to the wall of the tank. For example, the angular velocities of the nozzles 4 may be relatively high when they are directed horizontally, in which position the respective distances between the nozzles 4 and the wall of the tank 1 are relatively short. When the nozzles 4 move further downwardly their angular velocities may decrease up to the vertical orientations of the nozzles 4 in order to supply sufficient fluid onto the wall at a lower section of the tank 1.

Figure 9:
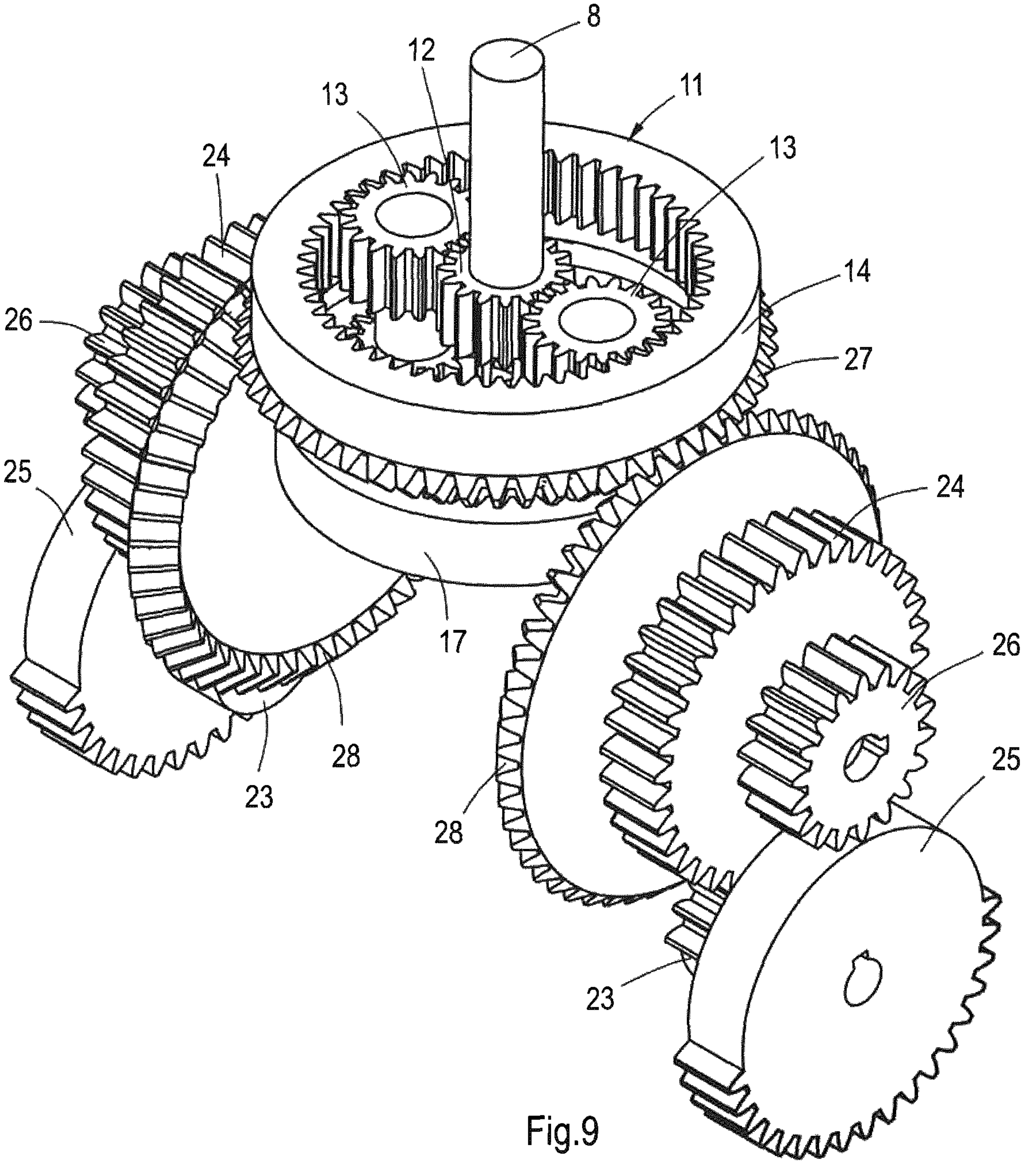
FIG. 9 is a similar view as FIG. 8, but showing another alternative embodiment.

FIG. 9 shows another alternative embodiment which has the similar frame conical gear 27 and the nozzle support conical gears 28 of the latter embodiment and the similar first to fourth gears 23-26 of the former embodiment.

The apparatus according to the invention appears to provide a uniform impingement track pattern on the inner walls of the tank. Besides, it provides the opportunity to easily modify the apparatus for different applications by changing gear ratios of the different gears in the apparatus.

The invention is not limited to the embodiments shown in the drawings and described hereinbefore, which may be varied in different manners within the scope of the claims and their technical equivalents.

The invention claimed is:

1. An apparatus for cleaning the inner side of a tank, the apparatus comprising:

- a frame which is mounted or mountable to a tank,
- a nozzle support which is rotatably mounted to the frame and drivable with respect to the frame about a first axis of rotation,
- a nozzle which is rotatably mounted to the nozzle support and drivable with respect to the nozzle support about a second axis of rotation extending transversely to the first axis of rotation, wherein the nozzle has a spraying direction facing away from the second axis, and
- a controller configured to drive the nozzle support and the nozzle, wherein the controller is configured such that, under operating conditions, the nozzle is rotated about the second axis alternatingly (i) from a cleaning start position to a cleaning stop position by a predefined cleaning angle and (ii) from the cleaning stop position to the cleaning start position, which cleaning angle is smaller than one revolution, and an angular velocity of the nozzle with respect to the nozzle support during the movement of the nozzle from the cleaning start position to the cleaning stop position within the cleaning angle is (i) smaller than an angular velocity of the nozzle support with respect to the frame and (ii) smaller than an angular velocity of the nozzle with respect to the nozzle support during the movement of the nozzle from the cleaning stop position to the cleaning start position.

2. The apparatus according to claim 1, wherein the angular velocities of the nozzle and the nozzle support are selected such that the position of the nozzle support with respect to the frame is different at two successive cleaning start positions of the nozzle.

3. The apparatus according to claim 1, wherein the cleaning angle lies between a quarter and three quarters of one revolution.

4. The apparatus according to claim 1, wherein at least one of the cleaning start position and the cleaning stop position is located where the spraying direction of the nozzle is substantially parallel to the first axis.

5. The apparatus according to claim 1, wherein the controller has a nozzle support drive unit which is provided at the frame and includes a main drive shaft which is drivably coupled to the nozzle support for rotating the nozzle support with respect to the frame.

6. The apparatus according to claim 5, wherein the controller is provided with (i) a nozzle shaft to which the nozzle is mounted and which is rotatable with respect to the nozzle support about the second axis and with (ii) a nozzle drive unit that is located at the nozzle support and which is drivably coupled to the nozzle shaft.

7. The apparatus according to claim 6, wherein the nozzle support drive unit is drivably coupled to the nozzle drive unit through the main drive shaft.

8. The apparatus according to claim 6, wherein:

- the nozzle drive unit has a nozzle drive shaft to which a first gear is attached, which first gear cooperates with a second gear that is attached to the nozzle shaft,
- at least one of the first and second gears is provided with gear teeth along only a portion of the circumference thereof,
- a third gear is attached to the nozzle drive shaft, which third gear cooperates with a fourth gear that is attached to the nozzle shaft,
- at least one of the third and fourth gears is provided with gear teeth along only a portion of the circumference thereof,
- the first and second gears mesh with each other within the cleaning angle, and
- the third and fourth gears mesh with each other outside the cleaning angle.

9. The apparatus according to claim 8, wherein:

- the second gear has a larger diameter than the first gear, and
- the first gear has gear teeth along its whole circumference.

10. The apparatus according to claim 8, wherein the gear ratio between the second and first gear is higher than the gear ratio between the fourth and third gear.

11. The apparatus according to claim 6, wherein the nozzle drive unit has a nozzle drive shaft to which a first non-circular gear is attached, which first non-circular gear cooperates with a second non-circular gear that is attached to the nozzle shaft.

12. The apparatus according to claim 7, wherein the main drive shaft is drivably coupled to the nozzle drive shaft.

13. The apparatus according to claim 8, wherein the nozzle shaft is a tubular shaft configured to guide cleaning fluid to the nozzle.

14. The apparatus according to claim 5, wherein:

- the nozzle support drive unit comprises an impeller which is attached to the main drive shaft, and the frame is provided with a guide configured to guide cleaning fluid to the impeller so as to drive the main drive shaft.

15. The apparatus according to claim 1, wherein the controller is configured such that, under operating conditions, the nozzle rotates reciprocatingly from the cleaning start position to the cleaning stop position and back.

16. The apparatus according to claim 1, wherein the first and second axes cross each other and/or extend perpendicular to each other.

17. The apparatus according to claim 1, wherein the controller is configured such that, under operating conditions, the angular velocity of the nozzle with respect to the nozzle support within the cleaning angle varies.

18. The apparatus according to claim 17, wherein the angular velocity of the nozzle with respect to the nozzle support decreases during the movement from the cleaning start position to the cleaning stop position.

19. A method for cleaning the inner side of a tank using the apparatus of claim 1, the method comprising:

rotating the nozzle support with respect to the frame about the first axis of rotation; and rotating the nozzle with respect to the nozzle support about the second axis of rotation, wherein:

the nozzle is rotated about the second axis alternatingly (i) from the cleaning start position to the cleaning stop position by the cleaning angle and (ii) from the cleaning stop position to the cleaning start position;

the cleaning angle is smaller than one revolution; and the angular velocity of the nozzle with respect to the nozzle support during the movement of the nozzle from the cleaning start position to the cleaning stop position within the cleaning angle is (i) smaller than the angular velocity of the nozzle support with respect to the frame and (ii) smaller than the angular velocity of the nozzle with respect to the nozzle support during the movement of the nozzle from the cleaning stop position to the cleaning start position.

20. The method of claim 19, wherein:

the controller has a nozzle support drive unit which is provided at the frame and includes a main drive shaft which is drivably coupled to the nozzle support for rotating the nozzle support with respect to the frame;

the controller is provided with (i) a nozzle shaft to which the nozzle is mounted and which is rotatable with respect to the nozzle support about the second axis and with (ii) a nozzle drive unit that is located at the nozzle support and which is drivably coupled to the nozzle shaft; and the nozzle support drive unit is drivably coupled to the nozzle drive unit through the main drive shaft.

21. The method according to claim 19, wherein, under operating conditions, the nozzle rotates reciprocatingly from the cleaning start position to the cleaning stop position and back.

* * * * *